United States Patent Office 2,923,879
Patented Feb. 2, 1960

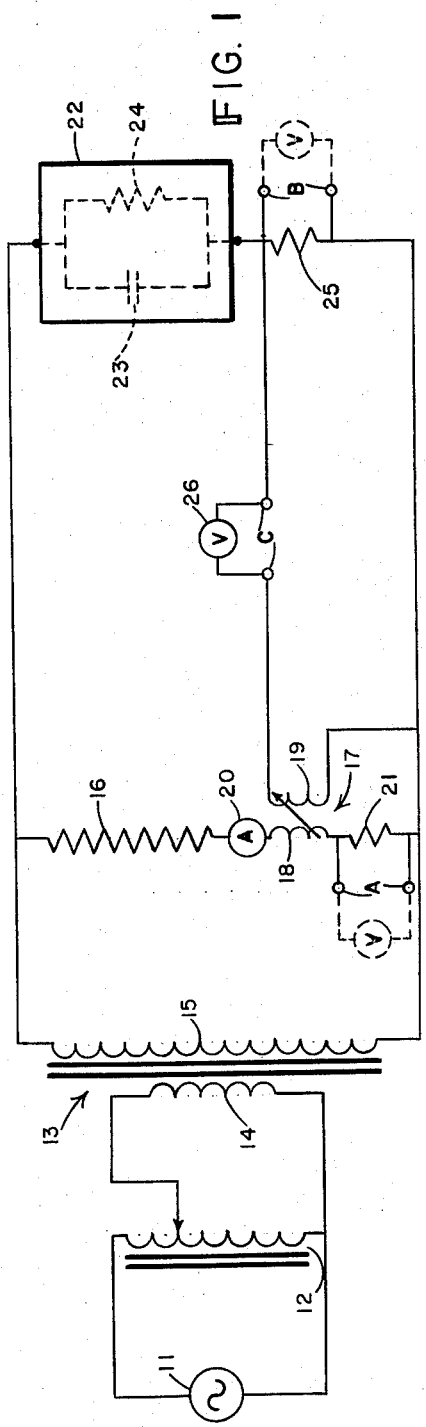
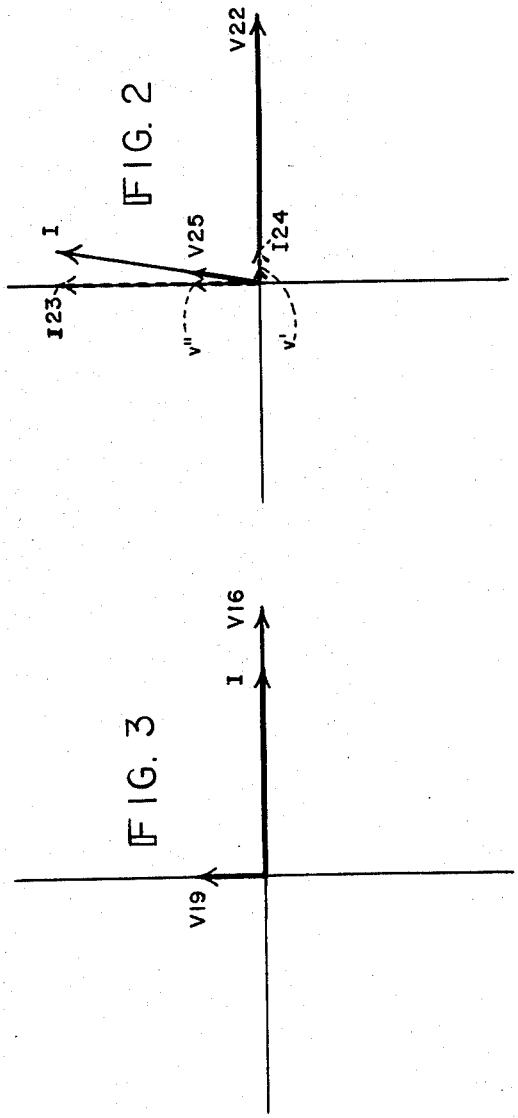

2,923,879

INSULATION TESTING APPARATUS

Edmund H. Povey, Medford, Mass., assignor to Doble Engineering Company, Belmont, Mass., a corporation of Massachusetts Application January 10, 1955, Serial No. 480,627

4 Claims. (Cl. 324—54)

This invention relates to apparatus for testing insulators and insulating materials, and more particularly it relates to an electrical network adapted to provide indications of the dielectric properties of insulation while subjecting the same to a relatively high test voltage.

In my application jointly with Glenn H. Browning, Serial No. 349,528 filed August 2, 1940, on which Patent 2,329,098 was granted September 7, 1943, there is disclosed improved insulation testing apparatus in the form of an electrical network which is capable of providing highly accurate indications of dielectric properties with a minimum of adjustment. It is an object of the present invention to provide insulation testing apparatus even more accurate than the prior apparatus and yet retaining all of its advantages including ease of adjustment as well as ruggedness and compactness. The apparatus or network according to the present invention comprises in essence a source of sinusoidal alternating voltage which is coupled to a test specimen of insulation to cause current to flow therethrough, and means to derive a first voltage representing the current in both magnitude and phase. Also connected across the source is a branch circuit including an inductive element to provide a second voltage equal in magnitude and phase to the component of the first voltage representing the reactive or charging current in the specimen. Since the voltage difference between the first and second voltages will then reflect only the resistive or leakage current in the insulator, means to measure this voltage difference is provided, from which the dielectric properties of the insulation may be readily determined.

The novel features of the invention together with further objects and advantages thereof will become more readily apparent when considered in connection with the accompanying drawing wherein:

Fig. 1 is a schematic diagram of the network according to this invention;

Fig. 2 is a vector diagram illustrating current and voltage relations in one branch of the network of Fig. 1; and Fig. 3 is a vector diagram illustrating current and voltage relations in another branch of the network of Fig. 1.

Referring now to the drawing and more particularly to Fig. 1, it will be observed that the network according to this invention includes a source of sinusoidal alternating current 11 to which is connected in cascade an adjustable auto transformer 12 and the primary winding 14 of a high voltage transformer 13, having a secondary winding 15. Source 11 may comprise any convenient supply such as a 60-cycle supply line or in the alternative may comprise a relatively high voltage source if available, in which case high voltage transformer 13 will of course be unnecessary. Assuming, however, as is usually the case, that the only convenient source of alternating current is a 60-cycle source at 110 volts, transformer 13 is utilized to increase the voltage supplied to the network to a relatively high value in the neighborhood of 10,000 volts, the exact value of the secondary voltage being determined with regard to the type of insulation to be tested. Connected across secondary winding 15 of transformer 13 is a branch circuit including a resistor 16, an ammeter 20, primary winding 18 of an adjustable mutual inductor 17, and a calibrating resistor 21 all in series combination. The input impedance of mutual inductor 17 is relatively small in comparison with the value of resistor 16 and so is the resistance of calibrating resistor 21 for reasons to be described in detail hereinafter.

In another branch circuit of the network, likewise connected across secondary winding 15 of transformer 13 in series combination, is a resistor 25 and an insulator 22 for test, the latter being represented in block form. Insulator 22 may comprise for example cable insulation, insulating oils, transformer bushings, and for that matter any type of material whose insulating or dielectric properties are of interest. As is well known, these materials can be represented electrically in terms of an equivalent capacitance and resistance whose values will be indicative of the quality of the material as an insulator. Accordingly, there is illustrated in dotted outline within the block 22 an equivalent capacitor 23 and an equivalent resistor 24 in parallel with one another whose values are initially unknown. It is significant, however, that the value of resistor 25 is made relatively small in comparison with the equivalent impedance of the circuit representing insulator 22 as will appear.

Finally, a high impedance voltage measuring device 26, such as a vacuum tube voltmeter, is provided for selective connection to one of three terminal pairs A, B and C, terminals A being connected to the legs or ends of resistor 21, terminals B being connected to the respective ends of resistor 25, and terminals C being connected respectively to the junction of resistor 25 and specimen 22, and one of the legs of secondary winding 19. The other leg of secondary winding 19 is connected to the end of resistor 25 remote from specimen 22.

In operation with specimen 22 placed in circuit, auto transformer 12 is adjusted until the desired test voltage is obtained across the secondary winding 15 of transformer 13, as indicated by ammeter 20. That is, ammeter 20 is preferably calibrated to read this voltage directly rather than current. Since the values of resistors 16 and 21, and the input impedance of mutual inductor 17 will remain fixed, this of course may be done conveniently without loss of accuracy. If desired, however, a conventional voltmeter may be utilized.

Once the secondary voltage has been established, the calibration of voltmeter 26 may be corrected, if necessary, by connecting it across terminals A and comparing its reading with the check voltage provided by calibrating resistor 21. Any other way of checking calibration may of course be employed alternatively, although the arrangement illustrated is preferred because of the convenience. Voltmeter 26 is next connected across terminals B for the purpose of determining the total current flowing through insulator 22. More particularly, the voltage developed across resistor 25 to which terminals B are connected will be proportional to the current so that the meter indication may be taken to represent the magnitude of the current, designated hereinafter as I. Finally, voltmeter 26 is disconnected from terminals B and connected across terminals C. The voltage across terminals C will be equal to the difference between the voltage across resistor 25 representing the total current through the insulator 22, and the voltage induced across the secondary winding 19 of mutual inductor 17. With reference to Fig. 2 the first mentioned of these voltages is illustrated vectorially together with the current in resistor 25 giving rise thereto. Since the value of resistor 25 is very small in comparison with the equivalent impedance of insulator 22, substantially all of the voltage induced across secondary winding 15 of high voltage transformer 13 appears across the insulator. This voltage is represented by vector V22. Similarly, the magnitude and phase of the current I flowing through the insulator 22, represented by vector I will be substantially dependent only on the respective values of the equivalent capacitor 23 and the equivalent resistor 24 representing the insulator electrically. Current I may be considered as being made up of two components at right angles to one another; one of these components, represented by vector I23 in quadrature with V22, corresponding to the current in equivalent capacitor 23, and the other of these components, represented by vector I24 in phase with V22, corresponding to the current in equivalent resistor 24. In other words, the magnitude of vector I23 will reflect the value of equivalent capacitor 23, whereas the magnitude of vector I24 will reflect the value of the equivalent resistor 24. The voltage drop across resistor 25, V25, produced by the total current I, may also be resolved into in-phase and quadrature components relative to vector V22 in like manner to current components I23 and I24, respectively. Thus, the in-phase component of voltage shown as vector $v'$ will correspond to the in-phase component of current I24 which in turn reflects the value of equivalent resistor 24; and the quadrature component of voltage shown as vector $v''$ will correspond to the quadrature component of current I23 which in turn reflects the value of equivalent capacitor 23.

Turning now to the branch circuit including resistor 16 and primary winding 18 of adjustable mutual inductor 17, the other voltage affecting the indication of meter 26 when connected across terminals C, namely, the voltage induced across secondary winding 19 of adjustable mutual inductor 17, will depend on the current in primary winding 18 and the mutual coupling between the windings. With reference to Fig. 3 it will be observed that the voltage developed across resistor 16, represented by vector V16 is substantially the same as the secondary voltage of high voltage transformer 13, since the value of resistor 16 is much greater than either the value of resistor 21 or the input impedance of mutual inductor 17. As a concomitant to the foregoing, the current in primary winding 18, shown by vector I, will be substantially in phase with the voltage V16, whereas the voltage V19 developed across secondary winding 19 will be in phase quadrature, owing to the fact that the impedance of voltmeter 26 is very high and therefore hardly any current flows through the secondary winding.

Comparing now both Figs. 2 and 3 it follows that voltage V19 will be in phase with the voltage component $v''$ representing the current through equivalent capacitor 23. If then, the magnitude of the voltage V19 is made equal to the voltage component $v''$, the remaining voltage difference across meter 26 will comprise only the voltage component $v'$ which in turn is indicative of the current in equivalent resistor 24. In other words, voltage component $v''$ will be effectively balanced by voltage V19, leaving only voltage component $v'$ to produce an indication on the meter. To produce this result mutual inductor 17 is adjusted until meter 26 reads a minimum. This minium reading may then be taken to represent the portion of the total current I through equivalent resistor 24, that is the leakage current through the insulator. Current I having already been determined by the meter reading when placed across terminals B, and the voltage across the insulator being substantially the same as that indicated by ammeter 20, it remains only to calculate the dielectric properties of the insulator, such as the values of equivalent capacitor 23 and equivalent 24 or the power loss in the specimen, in a manner well known to those skilled in the art.

Usually it is desired to ascertain the power factor of the insulator which may be done very readily according to this invention. With reference to the well known formula (1) $$PF = \frac{W}{EI}$$

where W is the power loss in the specimen and E and I are the voltage across it and the current therein, it will be recalled that an indication of the current I is obtained by placing voltmeter 26 across terminals B. The power loss W is equal to the current in equivalent resistor 24 multiplied by the voltage thereacross, so that Equation 1 may be rewritten as (2) $$PF = \frac{EI24}{EI} = \frac{I24}{I}$$

Since an indication of I14 is obtained by placing voltmeter 26 across terminals C, only a simple division of one value by the other remains to complete the determination of power factor. To further facilitate the determination of power factor, meter 26 may itself be adjusted to read 10 or some power thereof when placed across terminals B. When it is reconnected across terminals C and mutual inductor 17 adjusted to cause a minimum reading, it follows that this minimum reading will represent the power factor directly owing to the choice of denominator.

It should be understood, of course, that terminals A, B and C may be replaced by a suitable selector switch whereby voltmeter 26 may be selectively connected to the various points in the network to which terminals A, B and C are connected. As a matter of fact, it is preferred that such a switching arrangement be provided in order to expedite the testing of a specimen of insulation, although none has been shown in order to clarify the description of the apparatus. It may perhaps also occur to those skilled in the art that as an alternative to providing an adjustable mutual inductor for balancing out the quadrature voltage component, a fixed mutual inductor may be provided, and the quadrature voltage component itself varied until it becomes equal to the fixed voltage developed across the inductive element. Alternatively, a high resistance potentiometer could be connected across the secondary winding of the fixed mutual inductor to afford adjustment of the magnitude of the balancing voltage without changing its phase appreciably.

Various other modifications within the spirit and scope of the invention will occur to those skilled in the art so that I do not wish to limit myself to the precise embodiment illustrated. Rather the invention should be deemed to be limited only by the scope of the appended claims.

What I claim is:

1. Apparatus for testing the quality of an insulator comprising voltage supply means for impressing an alternating voltage across the insulator to cause current to flow therethrough, a first resistive element connected in series with the insulator across said voltage supply means to derive a first voltage representative of said current in both magnitude and phase, the resistance of said resistive element being relatively small in comparison with the equivalent impedance of said insulator, means including a second resistive element and a mutual inductive element having primary and secondary windings to derive a second voltage equal in magnitude and phase to the component of said first voltage representing the reactive component of the current in the insulator, said primary winding being connected in series with said second resistive element across said voltage supply means and having an impedance which is relatively small in comparison with the resistance of said second resistive element, and measuring means connectable between said first resistive element and the secondary winding of said inductive element to measure the difference between said first and second voltages, said voltage difference representing the resistive component of the current in the insulator.

2. Apparatus according to claim 1 wherein said mutual inductive element is adjustable.

3. Apparatus for testing the quality of an insulator comprising a source of alternating voltage, a first resistor connected in series with the insulator across said source, the resistance of said first resistor being relatively small in comparison with the equivalent impedance of said insulator, a second resistor, an adjustable mutual inductor whose input impedance is relatively small in comparison with the resistance of said second resistor, said mutual inductor having an input winding connected in series with said second resistor across said source and an output winding, and a high impedance voltage measuring device selectively connectable across said first resistor and across the series combination of said first resistor and said output winding to provide respective indications of the total current in said insulator and of the resistive component of said current.

4. Apparatus for testing the quality of an insulator comprising a source of alternating voltage, a first resistor connected in series with the insulator across said source, the resistance of said first resistor being relatively small in comparison with the equivalent impedance of said insulator, a second resistor, an adjustable mutual inductor whose input impedance is relatively small in comparison with the resistance of said secod resistor, said mutual inductor having an input winding connected in series with said second resistor across said source and an output winding having one of its legs coupled to said first resistor, a low impedance current measuring device in circuit with said input winding and said second resistor to provide an indication of the source voltage in terms of the current flowing in the circuit, and a high impedance voltage measuring device selectively connectable across said first resistor and across the series combination of said first resistor and said output winding, the sensitivity of said voltage measuring device being adjustable to provide respective precise indications of the total current through said insulator in terms of the voltage across said first resistor, and of the resistive component of the current in said insulator in terms of the voltage difference between the voltage across said first resistor and the voltage across said secondary winding when the magnitude of the latter is caused to equal the component of the former representing the reactive component of the current in the insulator.

References Cited in the file of this patent

UNITED STATES PATENTS

| 2,273,066 | Povey et al. | Feb. 17, 1942 |
| 2,329,098 | Browning et al. | Sept. 7, 1943 |
| 2,551,337 | Roberts | May 1, 1951 |
| 2,753,520 | Doll | July 3, 1956 |

FOREIGN PATENTS

| 587,417 | Great Britain | Apr. 24, 1947 |